Patented Sept. 7, 1937

2,092,453

UNITED STATES PATENT OFFICE 2,092,453

PROCESS FOR PURIFYING PREPARATIONS CONTAINING CORPUS LUTEUM HORMONES

Max Hartmann, Riehen, and Albert Wettstein, Basel, Switzerland, assignors to the firm of Society of Chemical Industry in Basle, Basel, Switzerland No Drawing. Application August 21, 1935, Serial No. 37,224. In Switzerland August 24, 1934

14 Claims. (Cl. 260—131)

This invention consists in a process of purifying preparations containing corpus luteum hormones, particularly for separating the diketones contained in the crude hormone crystallizate from hydroxyl-compounds constituting impurities, which consists in treating the hormone preparation or the crude hormone crystallizate with an acylating agent and separating the portion which has not entered into reaction, which contains the diketonic hormones, from the esterified portion.

Advantageously acylating agents are used which yield sparingly soluble esters with the hydroxy-ketones, for instance acetyl chloride or anhydride, benzoyl chloride, nitrobenzoyl chloride, dinitrobenzoyl chloride, phenylbenzoyl chloride, phenylisocyanate, diphenylisocyanate or phosgene. The separation of the hydroxy-compounds particularly hydroxyketones, from the diketones being merely a phase separation, is for the most part particularly simple when acylating agents are used which, in addition to the acylating group, contain a salt-forming group or a group which can be transformed into a salt-forming group; examples of such acylating agents are phthalic acid-anhydride, succinic acid-anhydride, maleic acid-anhydride, hydroxy-benzoic acid chlorides, chloro-sulfonic acid, phosphorylizing agents, such as phosphorus hydroxychloride, alkyl-meta-phosphate or the like.

In this manner it is possible to separate practically completely from crude hormone crystallizates the hydroxyketones from the active diketones in a single process of reaction. If desired, however, the acylation may be repeated.

The final products of the process find therapeutic application.

The following examples illustrate the invention:—

Example 1

400 milligrams of a crude hormone crystallizate obtained by reaction with semi-carbazide and final saponification are heated on the water-bath at 80° C. together with 300 milligrams of phthalic acid-anhydride in 5 cc. of pyridine for half-an-hour in an atmosphere of nitrogen. The whole is then mixed with water and thoroughly extracted with ether. The ethereal solution is repeatedly washed with a 2N-sodium carbonate solution, then with N/5-hydrochloric acid and finally with water. When the ether is evaporated there remains a crystallizate free from hydroxylated ballast material; by recrystallizing this crystallizate or by subliming it, individual hormones melting at 129° C. or 120° C. can be obtained.

For isolating the hydroxylated compounds the aqueous portion is acidified, after it has been united with the alkaline extracts, extracted with ether, the ethereal residue saponified with alcoholic alkali solution, the alcohol evaporated and the neutral portion again extracted with water aided by ether.

By recrystallizing the ethereal residue a hydroxyketone melting at 196.5–197.5° C. is obtained.

When the crude hormone crystallizate is caused to react with phthalic acid anhydride there may be used instead of pyridine another tertiary base, for instance quinoline, dimethylaniline and the like. It is also possible, however, to dispense completely with the use of these bases and to conduct the reaction by a simple heating operation.

Instead of phthalic acid-anhydride there may also be used in the same manner succinic acid-anhydride, maleic acid anhydride, phthalic acid chloride, maleic acid chloride or ortho-hydroxy-benzoyl chloride. In the latter three cases the reaction takes place at room temperature.

Example 2

200 milligrams of a crude hormone crystallizate obtained by reaction with semi-carbazide and final saponification are heated on the water-bath together with 230 milligrams of 2:4-dinitrobenzoyl-chloride in 5 cc. of quinoline for 1 hour. The whole is mixed with water and thoroughly extracted with ether. The ethereal solution is washed with dilute acid and finally with water. From the ethereal residue sparingly soluble dinitrobenzoic acid ester is removed by treatment with methyl alcohol. By fractionating the portion soluble in methyl alcohol the individual hormones of diketonic character described in Example 1 are obtained.

Instead of 2:4-dinitrobenzoyl-chloride there may, in an analogous manner, also be used benzoyl chloride, nitrobenzoyl chloride, acetyl chloride, acetic acid-anhydride, phenyl- or diphenyl-isocyanate and the like.

Example 3

1 gram of a preparation of corpus luteum, obtained as prescribed by W. M. Allen, Journal of Biological Chemistry, vol. 98, page 591, 1932, is heated on the boiling water-bath together with 1 gram of phthalic acid anhydride in 10 cc. of anhydrous pyridine for an hour. The whole is then mixed with water and thoroughly extracted with ether. The ethereal solution is repeatedly washed with N/30 caustic soda solution, acetic acid of 1 per cent. strength, sodium carbonate solution, and, finally, with water. On evaporation of the ether there is left a preparation resembling stearine and free from hydroxylated ballast substances. This preparation contains the whole of the active hormones of the parent material. From the aqueous portion, as well as from the purified alkaline extracts, the hydroxylated compound may be separated as described in Example 1.

What we claim is:—

1. A process for purifying preparations containing hydroxylated impurities besides the corpus luteum hormones, comprising reacting said preparations with an acylating agent, the portion which does not enter into reaction and contains the hormones being separated from the esterified portion.

2. A process for purifying preparations containing hydroxylated impurities besides the corpus luteum hormones, comprising reacting said preparations with such acylating agents which yield sparingly soluble esters with the hydroxyketones, the portion which does not enter into reaction and contains the hormones being separated from the esterified portion.

3. A process for purifying preparations containing hydroxylated impurities besides the corpus luteum hormones, comprising reacting said preparations with such acylating agents which yield sparingly soluble esters with the hydroxyketones, the portion which does not enter into reaction and contains the hormones being separated from the esterified portion by fractionated crystallization.

4. A process for purifying preparations containing hydroxylated impurities besides the corpus luteum hormones, comprising reacting said preparations with an acid halide, the portion which does not enter into reaction and contains the hormones being separated from the esterified portion by fractionated crystallization.

5. A process for purifying preparations containing hydroxylated impurities besides the corpus luteum hormones, comprising reacting said preparations with 2:4-dinitrobenzoylchloride, the portion which does not enter into reaction and contains the hormones being separated from the esterified portion by fractionated crystallization.

6. A process for purifying preparations containing hydroxylated impurities besides the corpus luteum hormones, comprising reacting said preparations with an acylating agent which contains besides the acylating group a salt-forming group, the portion which does not enter into reaction and contains the hormones being separated from the esterified portion.

7. A process for purifying preparations containing hydroxylated impurities besides the corpus luteum hormones, comprising reacting said preparations with an acylating agent which contains besides the acylating group a salt-forming group, the portion which does not enter into reaction and contains the hormones being separated from the esterified portion which forms salts easily soluble in water.

8. A process for purifying preparations containing hydroxylated impurities besides the corpus luteum hormones, comprising reacting said preparations with a dicarboxylic acid halide, the portion which does not enter into reaction and contains the hormones being separated from the esterified portion which forms salts easily soluble in water.

9. A process for purifying preparations containing hydroxylated impurities besides the corpus luteum hormones, comprising reacting said preparations with phthalic acid-chloride, the portion which does not enter into reaction and contains the hormones being separated from the esterified portion which forms salts easily soluble in water.

10. A process for purifying preparations containing hydroxylated impurities besides the corpus luteum hormones, comprising reacting said preparations with a dicarboxylic acid-anhydride, the portion which does not enter into reaction and contains the hormones being separated from the esterified portion which forms salts easily soluble in water.

11. A process for purifying preparations containing hydroxylated impurities besides the corpus luteum hormones, comprising reacting said preparations with phthalic acid-anhydride, the portion which does not enter into reaction and contains the hormones being separated from the esterified portion which forms salts easily soluble in water.

12. A process for purifying preparations containing hydroxylated impurities besides the corpus luteum hormones, comprising reacting crude hormone crystallizates containing hydroxylated impurities with 2:4-dinitro-benzoylchloride, the portion which does not enter into reaction and contains the hormones being separated from the esterified portion by fractional crystallization.

13. A process for purifying preparations containing hydroxylated impurities besides the corpus luteum hormones, comprising reacting crude hormone crystallizates containing hydroxylated impurities with phthalic acid chloride, the portion which does not enter into reaction and contains the hormones being separated from the esterified portion which forms salts easily soluble in water.

14. A process for purifying preparations containing hydroxylated impurities besides the corpus luteum hormones, comprising reacting crude hormone crystallizates containing hydroxylated impurities with phthalic acid anhydride, the portion which does not enter into reaction and contains the hormones being separated from the esterified portion which forms salts easily soluble in water.

MAX HARTMANN.
ALBERT WETTSTEIN.